June 10, 1941.  O. C. GILMORE  2,244,991
MULTIPLE IMAGE FILM GATE FOR MULTIPACK FILMS
Filed May 8, 1939  2 Sheets-Sheet 1
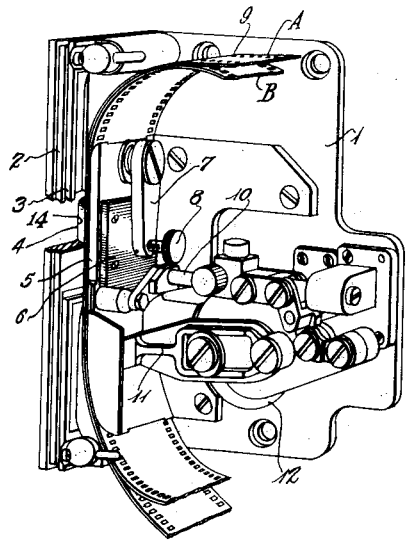
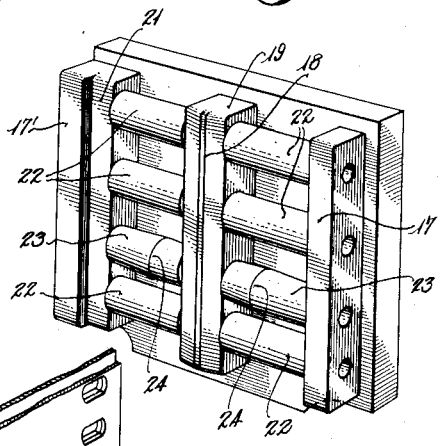
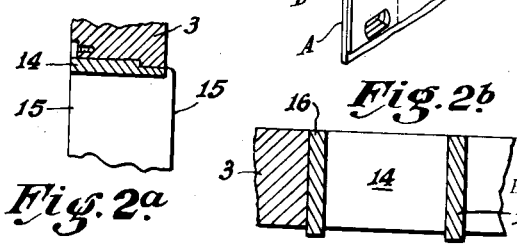
OTTO C. GILMORE,
INVENTOR;
BY Stevens and Davis
ATTORNEYS June 10, 1941.  O. C. GILMORE  2,244,991
MULTIPLE IMAGE FILM GATE FOR MULTIPACK FILMS
Filed May 8, 1939  2 Sheets-Sheet 2
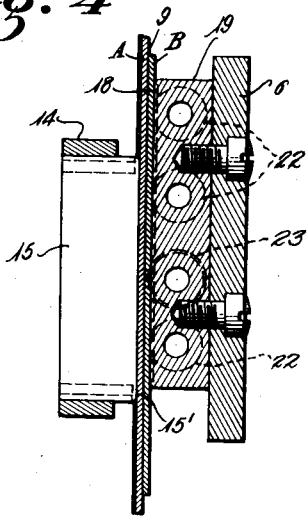
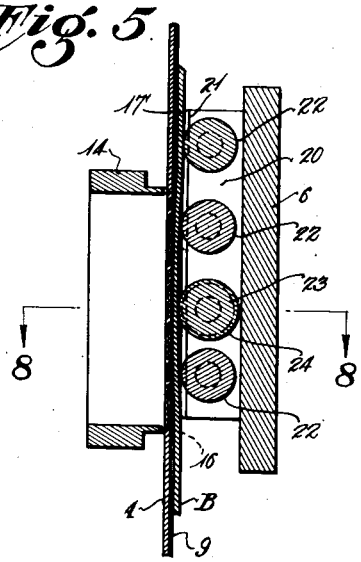
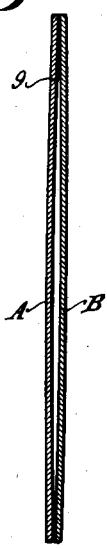
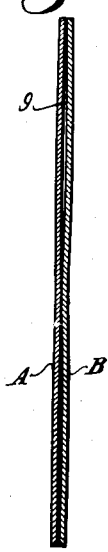
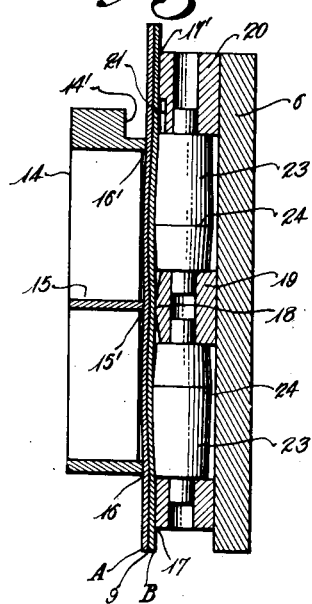
OTTO C. GILMORE,
INVENTOR;
BY Stevens & Davis
ATTORNEYS Patented June 10, 1941

2,244,991

UNITED STATES PATENT OFFICE 2,244,991

MULTIPLE IMAGE FILM GATE FOR MULTIPACK FILMS

Otto C. Gilmore, Van Nuys, Calif., assignor to Cosmocolor Corporation, New York, N. Y., a corporation of Delaware Application May 8, 1939, Serial No. 272,483

2 Claims. (Cl. 88—16.4)

This invention relates to photographic apparatus and more particularly to pressure plates for use in motion picture cameras.

This invention is principally concerned with a color process wherein a plurality of identical pictures are taken, as disclosed in United States Patents No. 1,978,789 and No. 2,137,570, issued to the present inventor and recorded on multi-pack film, as disclosed in application Serial No. 242,812, filed November 28, 1938 by this inventor. Briefly, this process comprises the revolving of a cone of image-bearing light so as to turn the image on its side, then directing this image-bearing light toward focus, and subsequently splitting the cone of light into a plurality of cones of light-bearing identical images. The image is thereby divided into two identical images which are recorded upon the film in side-by-side relation, the images being upon their sides. In order to secure three or four identical color-component images, the multi-pack film may be used to record superposed images, one behind the other.

Heretofore, considerable difficulty has been encountered in motion picture cameras particularly adapted for color photography wherein two films are run through the camera in face to face contact. In this type of process it is customary to superimpose two films with their emulsion sides in contact and sandwiched between the supporting layers. A great deal of difficulty has been experienced in making color pictures with films of this type due to the fact that it is almost impossible to hold the two photographic emulsions in perfect contact and this results in poor images caused by distortion, lack of focus, and even lack of proper superposition, or registration. These difficulties are caused by the fact that a piece of film will warp upon having a photographic emulsion coated thereon and consequently forms a concave surface on the emulsion side. When two films are placed together with their emulsion sides in contact, they tend to warp away from each other and consequently form an air space therebetween.

The above mentioned difficulties have been partly overcome by the device disclosed in United States Patent No. 1,927,887 to Crespinel. Crespinel discloses the use of a special pressure plate consisting of three convex rollers which press the rear concave film into contact with the front film. This arrangement keeps the films in close contact but they are convex toward the lens and do not lie in a flat plane as is desirable. This condition is more or less satisfactory for photographic processes wherein a full frame is used for each picture but in the present process which employs a divided aperture frame, the images being projected upon the film in side-by-side relation and upon their sides, the effect is to give an out-of-focus condition on the top of one image and the same out-of-focus condition at the bottom of the other image. After considerable experimentation it has been found that this method is absolutely impractical for use where two images are to be placed in a single frame.

In view of the above noted defects, the present invention is directed to a means to overcome these difficulties and to provide an arrangement adapted to maintain the films in substantially a single plane throughout both apertures. This invention further contemplates a unitary device that may be readily applied to standard cameras, whereby these cameras will be adapted to accommodate a plurality of superimposed films for the production of images in side-by-side relation.

Briefly, the present invention comprises an aperture frame, adapted to divide the standard size frame into two frames, which contacts the surface of the film in three lines by means of polished rails; one on each side of the frame and one along the middle of the frame; and in combination with this, a rear pressure plate having a corresponding three-point contact with the film, in the form of polished rails arranged to cooperate with the rails of the frame member, and a series of rollers between the rails on the pressure plate and arranged to individually contact each portion of the film behind each aperture area. The majority of the rollers are of the ordinary type, but one roller of each set is beveled slightly to form a low ridge between its extremities. The beveled rollers are positioned with respect to each other so that their respective ridges contact the film exactly in the centers of the side-by-side exposure areas so as to press the two superimposed films into close contact and to position these films in substantially the same plane in both aperture areas.

The novel features that I consider characteristic of my invention are set forth with particularity in the appended claims. The invention itself, however, both as to its organization and its method of operation together with additional objects and advantages thereof will best be understood from the following description of a specific embodiment when read in connection with the accompanying drawings, in which Figure 1 is a view in perspective of the pull-down mechanism and film gate of a standard type of camera, the pressure plate of the present invention being positioned therein and a portion of the front plate being removed to show the front aperture frame in position;

Figure 2 is a diagrammatic exploded view in perspective of the aperture frame, a pair of films in face-to-face relation, and the pressure plate;

Figure 2a is a cross-sectional view taken on a vertical plane through a portion of the front plate and the aperture frame;

Figure 2b is a cross-sectional view taken on a horizontal plane of a portion of the front plate and of the aperture frame;

Figure 3 is a front view in perspective of the new pressure plate;

Figure 4 is a cross-sectional view taken on the line 4—4 of Figure 2;

Figure 5 is a cross-sectional view taken on the line 5—5 of Figure 2;

Figure 6 is a cross-sectional view of a pair of films in face-to-face relation, illustrating the warp of the films;

Figure 7 is a cross-sectional view of a pair of films in face-to-face relation and pressed together along three lines; and Figure 8 is a cross-sectional view taken on the line 8—8 of Figure 5.

Referring specifically to the drawings, Figure 1 shows a film gate and pull-down mechanism comprising a base plate 1, upon which a film gate 2 is mounted. This film gate consists of a front plate 3 having an exposure aperture 4 therein, and a rear pressure plate 5 supporting a pressure pad 6 which is resiliently urged against the front plate 3. The pressure pad 6 is secured in position by an arm 7 and a thumb screw 8, which are carried by the rear plate 5. A pair of films 9 may be threaded between the plates 3 and the film gate 2 so that light may pass through the exposure aperture 4 to record four images upon the sensitive emulsions carried by the films 9. These films are positively located by a pair of reciprocating register pins 10 which are adapted to be inserted through film perforations during the time of exposure. Between exposures the films may be advanced to present fresh exposure areas by a pull-down claw 11 which may be operated in the usual manner by a cam 12. This mechanism is well known in the art and is of the same general type as is incorporated in many makes of cameras.

When the films 9 are fed through the above described film gate, the front film A tends to warp outwardly toward the camera lens and the rear film B warps rearwardly toward the rear plate 5. As these films are usually supported or pressed against each other only along their edges to prevent any scratching upon the faces of the films, this warping is not avoided by the usual structure and consequently, the individual film layers become spaced from each other in the center portions thereof to form air spaces best shown in Figure 6. Even when a divided image area is used, as according to the process with which the present invention is concerned, the films are only in contact at their edges and along their median lines where they are pressed between the guides of the film gate. These films become spaced in between the points of contact as best shown in Figure 7.

To overcome the spacing of the films as shown in Figure 7, the present invention comprises a front aperture frame 14 and a rear pressure pad 6, as best shown in Figures 2 and 3. The front aperture frame is divided by a septum 15 so as to provide two identical apertures on each side of the septum 15 to facilitate the production of two photographic images C upon each of the films 9, as indicated in broken lines in Figure 2. The front aperture frame 14 is provided with two film pressure runners 16 and 16' along the sides thereof and a central runner 15' along the rear edge of the septum 15. These runners 16, 16' and 15' extend rearwardly beyond the edges of the aperture frame, so as to contact the film along longitudinal lines and to prevent scratching of the film or gathering of gelatine or other material. The parallel runners 16, 16' and 15' are raised approximately .001 of an inch from the sides of the aperture frame so that the surface of the film contacts only the runners but the edges of the aperture are sufficiently close to the film to provide sharp frame lines on the recorded images. The runners are preferably highly polished to prevent undue scratching of the film. The runner 16' is spaced inwardly from the edge of the frame 14, the portion 14' therebetween being inset, whereby to provide space upon the film for a sound track.

The pressure pad 6 is likewise provided with three runners to cooperate with this aperture frame 14. The pressure pad 6 is provided with relatively broad runners 17 and 17' on either side thereof and a narrow runner 18 centrally thereof. As shown in Figure 8, the broad runners 17 and 17' contact the outer edges of the film along the portions containing the sprocket apertures and the central runner 18 is positioned opposite the runner 15' carried by the septum 15. The central runner 18 is carried by a central block 19, the front of which is tapered toward the center to form the runner 18. The side runner 17' is carried by a block 20 which is positioned along one edge of the pressure pad 6 and is provided with an inset portion 21 which corresponds to the sound track area upon the film and is located opposite the corresponding inset area 14' of the front frame 14 as best shown in Figure 8.

When a pair of films are run through a gate incorporating the members described above, the films have a cross-section at the exposure aperture which corresponds substantially to that shown in Figure 7. In order to retain the films in close contact relation the present invention further provides two series of rollers mounted on the rear pressure pad 6, the rollers being freely mounted in the blocks which support the runners 17, 17' and 18. Each series of rollers is adapted to operate behind one of the exposure apertures provided by the front aperture frame 14. As best shown in Figure 3 the majority of the rollers are ordinary cylindrical rollers 22 which are adapted to press the rear film into a flat plane.

One roller 23 of each set, however, is tapered to form a ridge 24 intermediate the ends of the roller. This ridge extends approximately .002 of an inch beyond the diameter of the rollers at their ends and acts to press the rear film into exact contact with the front film as best shown in Figures 5 and 8. The rollers are so arranged that the first cylindrical roller of each set contacts the film just prior to its passage behind the front aperture frame 14 and other cylindrical rollers contact the film at areas just within the top and bottom walls of the aperture frame. The ridged roller of each set is positioned so as to contact the film exactly in the center of the aperture area, the ridge of each of the rollers being positioned to contact the film exactly in the center of the exposure area of each aperture. In other words, the single ridged roller of each set is aligned upon the same horizontal axis with the ridged roller of the other set, and the ridges of the two rollers are so spaced that they coincide with the vertical center lines of the two exposure areas which are arranged in side-by-side relationship.

The rollers 23 are arranged so that the ridges 24 are spaced exactly .420 of an inch apart which represents the distance between the centers of the two image areas. The rollers 23 are placed in the pressure plate so that the ridges 24 press the rear film in the exact center of the two areas and press the two films A and B into contact as best shown in Figures 5 and 8. The ridges 24 press the rear film B forwardly against the direction in which the film is warped so that the film B will lie exactly in contact with the front film A, the two films being slightly bulged or convex, which condition has been exaggerated in the figures of the drawings to emphasize the manner in which the rollers 23 operate. In practice the pressure exerted by the ridged rollers 23 is so slight that there is practically no bulging of the film, and the plane of the two films at the apertures is substantially identical.

It is believed that the operation of this invention is readily evident in view of the foregoing description and drawings. A multi-pack film 9 which may comprise two or more separate film layers may be superimposed and run through the film gate 2. The film gate 2 will press the layers of the multi-pack film 9 into contact by means of the runners located at either side and in the center of the exposure aperture, the rollers 22 assisting in pressing the film layers into a flat plane. Due to the tendency of the individual layers of the film 9 to warp away from each other, the ridged rollers 23 are arranged to press the rear film layer B in a direction opposite to the warp thereof so that it may be exactly in contact with the front film layer A. The ridged rollers 23 are arranged so that the points of pressure, which are the ridges 24, contact the film exactly in the centers of the adjacent exposure areas so that the separate film layers are pressed into contact in substantially identical planes in both side-by-side exposure areas.

In the event that it is desired to record images in three or four image areas, it may be readily understood that additional sets of rollers and aperture frames may be provided to accommodate the additional images. In other words, if it is desired to record three or four images, an exposure frame may be provided with four exposure areas and a pressure pad may be provided with four sets of rollers. The critical point in such an arrangement would reside in the provision of the ridged roller, behind each exposure area, being arranged to contact the film in the exact center of its respective exposure area.

Although certain specific embodiments of the present invention have been shown and described, many modifications thereof are possible according to the specific need of each case. The invention, therefore, is not to be restricted except insofar as is necessitated by the prior art and by the spirit of the appended claims.

I claim:

1. A motion picture camera film gate for use with multi-pack film, comprising a front aperture frame provided with a pair of apertures aligned transversely of the direction of film travel, said apertures being separated by a septum, and film contacting runners extending from said frame adjacent the sides of each of said apertures and from said septum, in combination with a pressure plate provided with a plurality of film contacting runners extending therefrom to cooperate with the runners on said frame, and two sets of film contacting rollers, each set of rollers being located between two of said film contacting runners to correspond with each aperture in said frame, each set of rollers including a roller which is beveled outwardly from each end to form a protruding ridge about its circumference to insure contact between the films of the multi-pack, the ridged rollers being aligned upon an axis lying transversely of the direction of film travel and located centrally of the exposure apertures, the film contacting ridges of said rollers being axially spaced so that each ridge is aligned centrally of each exposure aperture.

2. A motion picture camera film gate for use with multi-pack films, comprising a front aperture frame provided with two apertures, said apertures being aligned transversely of the direction of film travel, film contacting runners extending from said frame adjacent the outer sides of each of said apertures, and a single film contacting runner extending from between the adjacent apertures, in combination with a pressure plate provided with two outer and one intermediate film contacting runners extending therefrom to cooperate with the runners on said frame, and two sets of film contacting rollers supported by said plate, each set of rollers being located between one of the outer and the intermediate film contacting runners to correspond with each aperture in said frame, each set of rollers including a single roller which is bevelled outwardly from each end to form a protruding ridge about its circumference to insure contact between the films of the multi-pack, each of said ridged rollers being arranged so that the ridged portion contacts the film substantially in the center only of its respective exposure area.

OTTO C. GILMORE.